Inventor
MAX J. TAUSCHEK
WILLIAM S. GLEESON

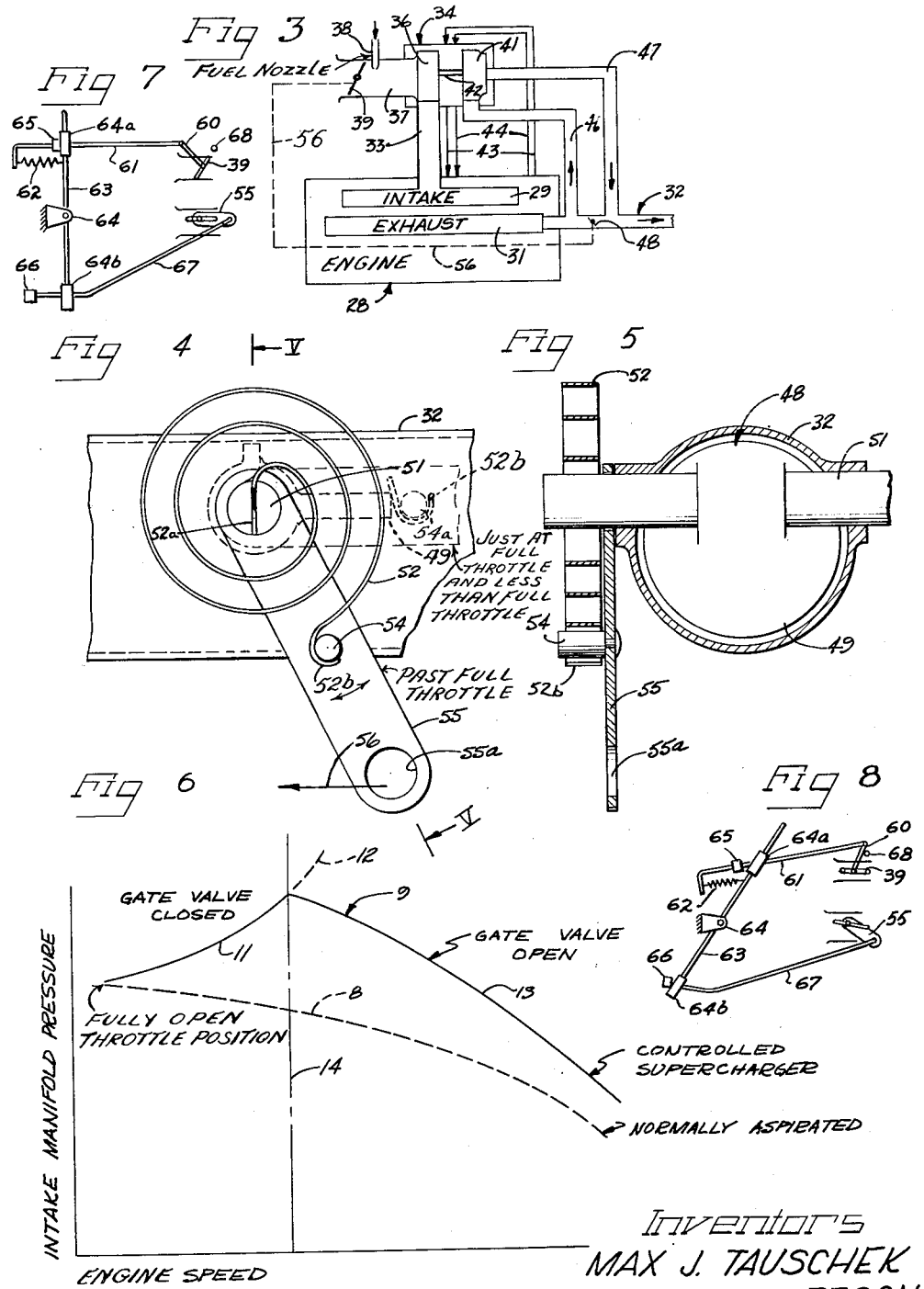

United States Patent Office 3,052,085
Patented Sept. 4, 1962

3,052,085
CONTROL FOR EXHAUST DRIVEN
SUPERCHARGER
Max J. Tauschek, Lyndhurst, and William S. Gleeson, Euclid, Ohio, assignors to Thompson Ramo Wooldridge Inc., Cleveland, Ohio, a corporation of Ohio
Filed Nov. 21, 1958, Ser. No. 775,495
3 Claims. (Cl. 60—13)

The present invention relates to an improved method of operating a gasoline-fueled internal combustion engine for improved fuel economy without the sacrifice of reserve engine power, and particularly the method of operation of an engine used for driving a vehicle such as an automobile. More particularly the improved method relates to operating a gasoline-fueled internal combustion engine with controlled supercharging and to a mechanism therefor, with supercharging pressure being applied only after full throttle opening and being a function of the speed of the engine (as measured by manifold exhaust pressure) and also being a function of the position of the engine throttle valve linkage both at full throttle valve opening.

An object of the present invention is to provide an improved method of operating a gasoline-fueled internal combustion engine, such as in driving an automobile, wherein the fuel consumption at any given speed can be reduced without the sacrifice of reserve power such as is needed for acceleration of the automobile and is needed in emergency conditions.

Another object of the invention is to provide a method whereby the rear axle ratio of an automobile or similar vehicle can be reduced to reduce the operating speed of the engine and thereby increase fuel economy by reducing friction losses in the engine and yet retain a power reserve similar to the power reserve of the engine at a higher axle ratio.

A further object of the invention is to provide an improved method for obtaining reserve power for gasoline-fueled internal combustion engines, which is made available only when the engine throttle valve is fully open.

Another object is to increase reserve power by supercharging in response to movement of throttle linkage beyond full throttle position.

A further object of the invention is to provide an improved method in which an engine is supercharged at a pressure which is above but which follows the pressure curve of the intake manifold of a normally aspirated engine.

A further object of the invention is to provide an improved method for providing a peak power reserve for an engine at a predetermined peaking speed and at all higher speeds and wherein the peaking speed may be preselected for the engine.

A still further object of the invention is to provide an improved mechanism and apparatus for the practice of the method of the invention in accordance with the foregoing objectives.

Other objects and advantages will become more apparent with the teaching of the principles of the invention in connection with the disclosure of the preferred methods and embodiments thereof in the specification, claims and drawings, in which:

FIGURE 3 is a somewhat schematic drawing of a turbo-charged engine and a control for the turbo-charger for practicing the method of the invention;

FIGURE 4 is a detailed side elevational view of a gate valve for controlling flow of exhaust gas to the turbo-charger or to the atmosphere;

FIGURE 5 is a sectional view taken substantially along line V—V of FIGURE 4 but showing the waste gate valve plate in closed position;

FIGURE 6 is a graph showing the relationship of intake manifold pressure to speed for a normally aspirated engine and an engine operated in accordance with the present invention; and FIGURES 7 and 8 show schematically different positions of the throttle linkage.

As shown in the drawings:

Figure 1:
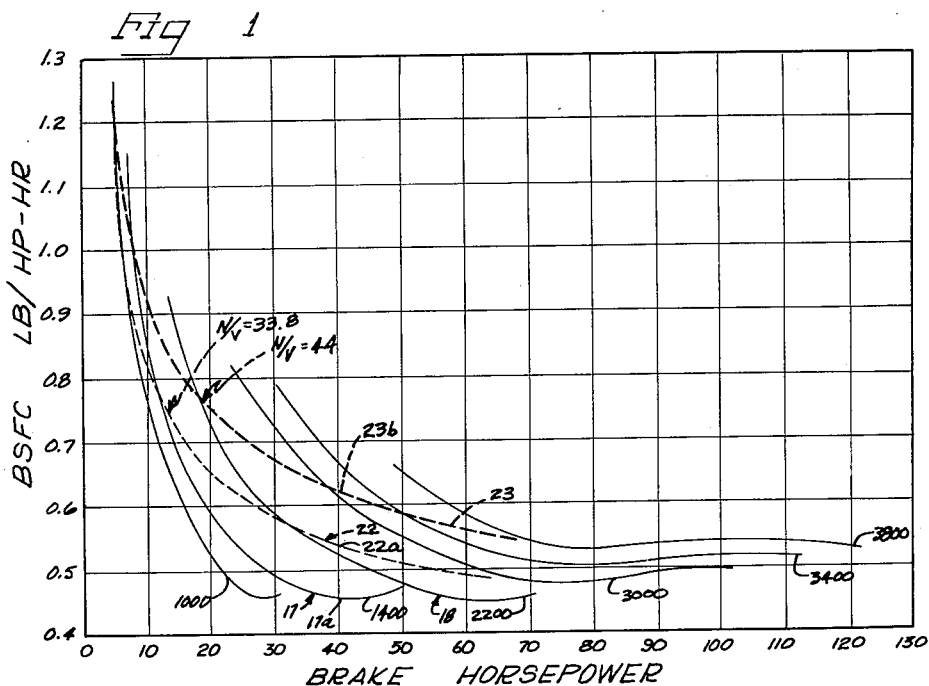
FIGURE 1 is a graph illustrating a number of curves showing the relationship of brake specific fuel consumption to brake horsepower for an engine operated at different speeds and for an engine in an automobile operated with different rear axle ratios.

In accordance with the present method, a gasoline-fueled internal combustion engine is operated by pressurizing the intake manifold for supercharged operation after the throttle is fully opened. The amount of supercharging is related to engine speed. The supercharged pressure, as measured in the intake manifold of an engine, is increased until a peaking pressure is reached, and the supercharged pressure is then controlled with increase in speed (at full throttle), with the overall supercharging pressure generally following the slope of the pressure curve for a normally aspirated engine (also at full throttle).

In accordance with further steps of the method of operation, the supercharged pressure for any given speed is increased as a function of a further demand signal, applied such as by moving the throttle linkage a further distance past full throttle position.

The method of operation may be observed in connection with FIGURE 6. The broken line curve 8 indicates the intake manifold pressure for a normally aspirated engine. In normal operation of an engine, the intake manifold pressure drops with speed increase (at full throttle) in accordance with the general shape of the curve 8.

The relationship between the intake manifold pressure and speed (at full throttle) for an engine supercharged in accordance with the method of operation of the present invention is shown by the curve 9. The overall curve generally follows the trend of the pressure curve for the normally aspirated engine, but is above the curve. The intake manifold pressure is first increased along the line 11 as a function of speed increase until a peaking speed is reached as indicated by the vertical line 14. The intake manifold pressure then decreases with speed increase along the line 13. The peaking speed at line 14 is preferably chosen as the speed which will give the highest torque output for the engine when normally aspirated at full throttle.

The vertical distance between line 8 and line 9 indicates the pressure increase due to supercharging. Line 9 indicates pressure at full throttle, or in other words, with the throttle fully open. Line 9 is reached by moving the throttle linkage to a full demand position, past full open throttle.

The supercharged pressure in the intake manifold is varied at any given speed (at full throttle) as a function of the movement of the throttle linkage past full throttle position or, in other words, supercharging begins at full throttle and increases with movement of the throttle linkage past full throttle position. Thus, for any throttle valve opening less than full open, the manifold pressure will be below the dotted line 8.

In the operation of an engine in accordance with the present method, in order to reduce the fuel consumption, the speed of the engine is reduced. Similar results can be obtained by reducing the size of the engine. When the engine is used to propel a vehicle such as an automobile, the rear axle ratio is reduced, and for any given speed of the vehicle, the engine will run at a slower speed, thus reducing friction losses and increasing fuel economy as measured in miles per gallon. Heretofore this has not been practical since by reducing the engine speed in this manner, the reserve power necessary is not available. Because of the requirements for reserve power, the engines of automotive vehicles normally run at higher speeds than necessary and operate at only a small fraction of their capacity. The remaining capacity is available for reserve power, such as for acceleration and for emergency conditions.

In accordance with the present method, this reserve power is provided by selectively supercharging the engine when the reserve power is needed, that is, when the engine is accelerated by the opening of the throttle valve to full open position, and the throttle linkage moved past full open position. The reserve power is made available by supercharging at full open throttle an amount which is an increase over the intake manifold pressure of the normally aspirated engine, and the increase generally follows the curve of a normally aspirated engine. The amount of supercharging is such so as to restore the reserve power lost in reducing the engine speed.

Figure 2:
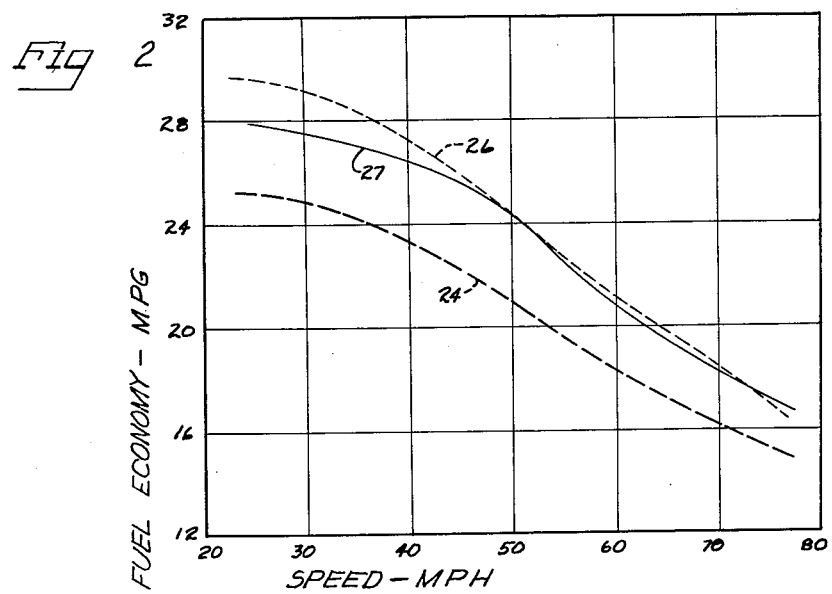
FIGURE 2 is a graph illustrating the relationship between fuel consumption and speed of an automobile with different engines and axle ratios.

The curves of FIGURES 1 and 2 illustrate the effect of the method in obtaining increased engine efficiency without sacrificing reserve power.

The solid line curves of FIGURE 1 illustrate the relationship between the horsepower output and the specific fuel consumption of an engine at various speeds. Curves for the speeds of 1,000 r.p.m., 1,400 r.p.m., 2,200 r.p.m., 3,000 r.p.m., 3,400 r.p.m and 3,800 rp.m. are shown. As is indicated by the curves, for any given desired horsepower output, as the engine speed is increased for that horsepower output, the fuel consumption increases. For example, for an output of 40 horsepower, if the engine can be run at 1,400 r.p.m. the optimum efficiency at point 17a in the curve can be achieved. However, if the engine is run at 2,200 r.p.m., it is operating at a point less than its optimum efficiency and the specific fuel consumption is substantially doubled from what it was at 1,400 r.p.m. Thus, a feature of the present invention is to enable an engine to run at lower speeds and thus achieve operation at a more efficient point in the horsepower output curve. This desirable effect has not heretofore been possible, since it has been necessary to provide for reserve power for emergency conditions and, in the case of automobiles, for performance to satisfy the automobile purchaser.

The dotted line curves of FIGURE 1 illustrate the relationship between horsepower output and specific fuel consumption of an engine as operated in an automobile with different rear axle ratios. Curve 22 illustrates engine performance with a rear axle ratio $N/V=33.8$, and curve 23 illustrates engine performance with a rear axle ratio $N/V=44$; where, N is the engine revolutions per minute and V is the speed of the automobile in miles per hour.

It will be observed that for any given horsepower output at part throttle, the specific fuel consumption per horsepower is reduced at the lower rear axle ratio and assuming a fixed road speed a lower engine speed. For example, for a brake horsepower output of 40 horsepower, the brake specific fuel consumption is about .54 pound of fuel per horsepower hour as shown at 22a. With a higher axle ratio, and correspondingly higher engine speed, assuming the same horsepower output to propel the vehicle, the brake specific fuel consumption increases to about .62 pound of fuel per horsepower hour, as shown at 23b.

Thus, by the present method, fuel economy has been markedly improved. While the engine operates at a lower speed and at improved economy, the reserve power is available by supercharging whenever the reserve power is needed and the amount of supercharging will be a function of the speed of the engine and position of the throttle linkage after full opening of the throttle valve, and a function of a demand signal, which is generated by the operator pushing the accelerator past the full throttle opening position.

The improved economy as a result of the method is further illustrated in FIGURE 2, where the curve 24 illustrates the relationship between engine speed and fuel economy for a normally aspirated engine. The solid line 27 indicates fuel economy in miles per gallon for a supercharged engine, and it will be observed that there is a significant increase in economy.

Increased economy may be achieved in another way with the use of the principles of providing reserve power by supercharging, such as by replacing an engine of an automobile with a smaller engine, without changing the rear axle ratio. With the use of a smaller engine having a smaller displacement, decreased fuel consumption, of course, results and the engine will operate at a more economical point in its performance curve to achieve increased economy. The operating curve of a smaller engine is shown at 26 in FIGURE 2, and it will again be observed that the fuel economy is increased over an engine of larger size which is normally aspirated. The smaller engine is of course supercharged in accordance with the present invention so that reserve power is available, the same as with a larger engine, but fuel economy is achieved.

One form of apparatus for practicing the method is illustrated in FIGURES 3, 4, 5, 7 and 8. An engine 28 is shown which is preferably a gasoline fueled-internal combustion engine, such as the type used for operation of vehicles as trucks and automobiles. The engine is provided with an intake manifold 29 and an exhaust manifold 31. The exhaust manifold discharges exhaust gas through an exhaust pipe 32 and flow through the exhaust pipe is controlled so that a portion of the exhaust gas is used to operate a turbocharger 34.

A mixture of air and fuel is delivered to the intake manifold of the engine through an intake conduit 33 which is connected to the discharge of a compressor 36 of the turbocharger 34. The compressor connects to an air intake conduit 37 to which fuel is delivered by a fuel delivery nozzle 38, and a throttle valve 39 is positioned in the conduit 37. The fuel delivery nozzle 38 may be a fuel injection nozzle or a carburetor may be used for the delivery of fuel. A fuel injection nozzle may instead be placed in the conduit 33 or point fuel injection may be used to deliver fuel into the intake manifold 29 at each of the cylinders of the engine. The throttle valve may in some instances be in the conduit 33 and various fuel delivery arrangement may be used, as will be appreciated by those skilled in the art.

The compressor 36 is operated by an exhaust gas driven turbine 41 and may be thus referred to as a turbocharger. The turbine drives a shaft 42 connected to drive the compressor 36. The turbocharger 34 may be connected to the cooling system of the engine 28 and to the lubricating system, with coolant and lubricant flowing to the turbocharger and back to the engine through lines 43 and 44.

For driving the turbocharger, an exhaust gas line 46 connects to the engine exhaust 32 and leads to the intake of the turbine 41. The exhaust gas leaves the turbine 41 through a line 47 which returns to the engine exhaust line 32. A waste gate valve 48 is positioned in the engine exhaust line 32 between the turbine lines 46 and 47 so that the proportion of gas delivered to drive the turbine will be dependent on the setting of the waste gate valve 48. As the waste gate valve is opened a greater proportion of the gas is by-passed past the turbine and exhausted to atmosphere, and as the waste gate valve is closed an increasing amount of the exhaust gas is delivered directly to drive the turbine 41.

The details of construction of the waste gate valve and its control is shown in FIGURES 4 and 5. The engine exhaust line 32 is shown as being circular in cross-sectional configuration and the waste gate valve 48 includes a flat plate 49 which is supported on a pivotal shaft 51 supported to extend across the exhaust line 32. The shaft 51 is connected to the valve plate 49 at a location displaced from its center so that a pressure differential across the plate 49 will tend to pivot the plate to open position.

A waste gate biasing spring 52 is used to bias the waste gate valve toward closed position when the throttle is moved beyond its fully open position. The spring 52 is shown as being spiral in shape and has an inner end 52a connected to the valve shaft 51. An outer end 52b of the spiral spring is hook-shaped to receive a spring engaging pin 54 which is carried on a swinging arm 55, loosely hung on the valve shaft 51. The arm is provided with an opening 55a at the end for connecting linkage which is shown schematically at 56. This linkage connects to the throttle valve linkage and the arm 55 is swung in a clockwise direction, as shown in FIGURE 4, when the throttle valve linkage is moved toward open position for the throttle valve and when the linkage is moved past the full throttle position.

As shown schematically in FIGURES 7 and 8, the throttle valve or plate 39 may have an arm 60 connected to an operating rod 61. Rod 61 is pushed forward to open the throttle 39 by a tension spring 62 connected between the end of the rod 61 and a throttle arm 63. The throttle arm is pivotally mounted at 64. The throttle arm is connected to the rod 61 by a slide fitting 64a which is held against a stop 65 secured to the rod 61. The other end of the throttle arm has a slide 64b engaging a stop 66 on a rod 67, connected to the waste gate arm 55, when the throttle 39 is in open position. The throttle arm 63 is stopped in a position where the throttle is fully open, by a stop 68.

When the throttle arm is moved clockwise, as shown in FIGURE 8, the throttle plate 39 will move to open position and at that point the stop 68 will terminate further movement of the throttle rod 61, while the slide 64b at the lower end of the throttle arm will engage the projection 66 to start moving the rod 67 and the arm 55. The spring 62 and slide 64a will permit further movement of the throttle arm 63 without further moving the throttle plate 39. As will be recognized by those skilled in the art various types of linkages may be employed which permit operation of the arm 55 after the throttle plate 39 is moved to a fully open position.

The biasing spring force which is applied by the spring to the waste gate shaft 51 and which tends to hold the waste gate 48 closed depends upon the spring rate of the spring 52. This is varied with movement of the throttle linkage by swinging the arm 55 to further tension the spiral spring 52. The action of the linkage is as follows: When the throttle 39 is at its wide open position, the spring end 52b just touches the pin 54 with the plate 49 in the wide open position. This occurs when the pin is at position 54a, FIGURE 4 (the spring hook 52b will also be at this position when the plate 49 is in the open position). Further movement of the throttle linkage 56 does not change the position of the throttle 39, but does increase the tension on the spring 52. The movement of the linkage 56 beyond full throttle position may be termed a power demand signal.

The performance of the waste gate valve 48 at the maximum rotated position of the arm 55 and pin 54 is shown by the solid line 9 of the graph of FIGURE 6. The spring tension will be sufficient to hold the gate closed until the design speed of the turbine wheel is reached, and at that point the pressure differential across the plate 49 will open the valve against the spring. The biasing force of the spring is such to cause a performance curve to be achieved as illustrated at 13 in FIGURE 6 at full tension for spring 52. At throttle openings less than full throttle, the arm 55 will not apply a tension on the spring 52. The intake manifold pressure curve 9 will then be the dotted line curve 8. At spring tensions caused by the throttle linkage being moved past the full open throttle position, the intake manifold pressure curve will lie somewhat between solid line 9 and dotted line 8.

The spring, permitting the gate valve to open, also prevents the turbocharger from overspeeding as the exhaust pressure increases. If the curve 11 were to follow into curve 12, such as would occur if all of the exhaust continued to flow to the turbine, the design limits of the turbocharger 34 would be exceeded as well as the pressure limits of the engine and conduits.

Thus, it will be seen that we have provided an improved method of operating a gasoline-fueled internal combustion engine and of operating an engine used in an automotive vehicle, the method and apparatus disclosed achieving the objectives and advantages hereinbefore set forth. The method and apparatus provide a controlled supercharging of the engine to provide reserve power for the engine and the engine is operated at points in its performance curve obtaining higher efficiency.

We have, in the drawings and specification, presented a detailed disclosure of the preferred embodiments of our invention, and it is to be understood that we do not intend to limit the invention to the specific forms disclosed, but intend to cover all modifications, changes and alternative constructions and methods falling within the scope of the principles taught by our invention.

We claim as our invention:

1. In an engine having a throttle valve, the combination comprising a turbocharger driven by exhaust gases, a waste gas valve urged to open position by the flow of exhaust gases and positioned to divert an increasing quantity of exhaust gases to the turbocharger as it is moved away from the open position toward a closed position, a spring connected to the waste valve for urging it to closed position, a throttle control linkage connected to the throttle valve and movable from a closed to an open position, and means connecting said spring to said throttle control linkage for operation of the waste valve in positions of the linkage past full open throttle position, said linkage having a range of movement past said full throttle position wherein the throttle valve is maintained in fully open position and the tension of the waste gate spring is varied with movement of the linkage to vary the quantity of gas diverted to the turbocharger.

2. In an engine having a throttle valve, the combination comprising a turbocharger driven by exhaust gases, a waste gate valve urged to open position by the flow of exhaust gases and positioned to divert an increasing quantity of exhaust gases to the turbocharger as it is moved away from the open position toward a closed position, a spring connected to the waste valve for urging it to closed position, a throttle control linkage connected to the throttle valve and movable from a closed to an open position, means connecting said spring to said throttle control linkage for operation of the waste valve in positions of the linkage past full open throttle position, and a member attached to said linkage engageable with said spring only at positions past full throttle position, said linkage having a range of movement past said full throttle position wherein the throttle valve is maintained in fully open position and the tension of the waste gate spring is varied with movement of the linkage to vary the quantity of gas diverted to the turbocharger.

3. In an engine having a throttle valve, the combination comprising a turbocharger driven by exhaust gases, a plate-like waste gate valve urged to open position by the flow of exhaust gases and positioned to divert an increasing quantity of exhaust gases to the turbocharger as it is moved away from the open position toward a closed position, a pivotal shaft supporting said waste valve at a location eccentric of the center of the valve so that the valve will be urged to open position with exhaust gas pressure differential thereacross; an arm pivotally mounted coaxial with the shaft, a spiral spring having an inner end connected to said shaft and an outer end adapted for engagement by said arm; and a throttle control linkage connected to the throttle valve and movable from a closed to an open position, said linkage having a range of movement past said full throttle position wherein the throttle valve is maintained in fully open position, said arm being connected to said linkage and engaging the outer end of the spring in said range of linkage movement past full throttle position and increasing the tension of the waste gate spring to increase the quantity of gas diverted to the turbocharger with increased movement of the linkage past said full throttle position.

References Cited in the file of this patent

UNITED STATES PATENTS

| | | |
|---|---|---|
| 1,571,143 | Royer | Jan. 26, 1926 |
| 1,984,013 | Fast | Dec. 11, 1934 |
| 2,428,708 | Heftler | Oct. 7, 1947 |
| 2,491,380 | Kutzler | Dec. 13, 1949 |
| 2,562,742 | Rowe et al. | July 31, 1951 |
| 2,731,792 | Nallinger | Jan. 24, 1956 |
| 2,949,732 | Schroeder | Aug. 23, 1960 |